United States Patent [19]

Suhara et al.

[11] Patent Number: 4,543,378

[45] Date of Patent: Sep. 24, 1985

[54] POLYAMIDE COMPOSITION

[75] Inventors: Akito Suhara; Kazuhiko Takasugi; Toshihide Sato, all of Ube; Masashi Ono, Hatano; Kazuo Higuchi, Chigasaki; Tatsuya Chiba, Ebina, all of Japan

[73] Assignees: Ube Industries, Ltd., Yamaguchi; Nissan Motor Company, Ltd., Kanagawa, both of Japan

[21] Appl. No.: 515,577

[22] Filed: Jul. 20, 1983

[30] Foreign Application Priority Data

Jul. 21, 1982 [JP] Japan .................................. 57-126870

[51] Int. Cl.$^4$ ................................................. C08K 5/34
[52] U.S. Cl. .................................... 524/100; 524/101; 524/606
[58] Field of Search ........................ 524/606, 100, 101

[56] References Cited

U.S. PATENT DOCUMENTS

| 3,575,939 | 4/1971 | Kochhar et al. | 524/101 |
| 3,632,558 | 1/1972 | Siclari et al. | 528/315 |
| 3,644,299 | 2/1972 | Fester et al. | 528/315 |
| 4,001,177 | 1/1977 | Tsutsumi et al. | 524/100 |
| 4,013,601 | 3/1977 | Alford | 523/402 |
| 4,197,235 | 4/1980 | Nield et al. | 524/100 |
| 4,314,927 | 2/1982 | Theysohn et al. | 524/606 |
| 4,414,358 | 11/1983 | Nield et al. | 524/447 |

Primary Examiner—Lewis T. Jacobs
Attorney, Agent, or Firm—Burgess, Ryan & Wayne

[57] ABSTRACT

A polyamide composition having an enhanced adhesion to coatings, which comprises a polyamide with a ratio of the terminal amino group concentration to the terminal carboxyl group concentration of at least 1.5, an inorganic filler, and a triazine, wherein the amount of the inorganic filler is from 1 to 150 weight parts per 100 weight parts of the polyamide and the amount of the triazine is more than 1 weight part per 100 weight parts of the sum of the polyamide and the inorganic filler.

9 Claims, No Drawings

POLYAMIDE COMPOSITION

BACKGROUND OF THE INVENTION (1) Field of the Invention

This invention relates to a polyamide composition. More particularly, it relates to a polyamide composition having an enhanced adhesion to coatings formed from various paints, especially acrylic melamine, urethane, acrylic urethane, and melamine alkyd type paints.

(2) Description of the Prior Art

Polyamides are excellent as engineering plastics, and as such, are used in large quantities in automobiles, electric appliances, farming equipment, and construction materials. The need has arisen recently for the development of polyamides on which coatings of desired color tones can be formed. However, conventional polyamides have a poor adhesion to coatings; when coatings are formed directly on molded polyamide articles, the coating readily peels or rubs off during use of the articles. Accordingly, the coating of polyamide molded articles has heretofore been accomplished by a complicated method in which a a primer is first applied, followed by a layer of paint. This method is in itself complicated and troublesome, and moreover, gives rise to a serious practical problem when applied to the coating of exterior trim parts on automobiles and the like. Namely, when an outer metal plate of an automobile and an exterior polyamide trim part coated with paint of the same color, a delicate discrepancy in color arises, lowering the commercial value. Furthermore, the number of coating steps and the coating cost are increased.

SUMMARY OF THE INVENTION

It is therefore a primary object of the present invention to provide a polyamide composition which has an enhanced adhesion to coatings formed from various paints, including those popularly used for coating exterior trim parts on automobiles and having poor adhesion to ordinary polyamides, such as acrylic melamine, urethane, acrylic urethane, and melamine alkyd type paints, and which composition can be directly coated with various paints without precoating with a primer.

In accordance with the present invention, there is provided a polyamide composition comprising a polyamide with a ratio of terminal amino group concentration to terminal carboxyl group concentration of at least 1.5, an inorganic filler, and a triazine, wherein the amount of the inorganic filler is in the range of from 1 to 150 parts by weight per 100 parts by weight of the polyamide and the amount of the triazine is more than 1 part by weight per 100 parts by weight of the sum of the polyamide and inorganic filler.

DESCRIPTION OF THE PREFERRED EMBODIMENTS

In the instant specification, the expression "ratio of the terminal amino group concentration to the terminal carboxyl group concentration" means the ratio of the concentration of terminal amino groups in gram-equivalents/g to the concentration of terminal carboxyl groups in gram-equivalents/g. In the description given hereinafter, a polyamide in which this ratio is at least 1.5 is often called "a highly amino-terminated polyamide".

The polyamide used in the present invention may be, for example, polylactams such as nylon 6, nylon 11, and nylon 12; polyamides derived from a dicarboxylic acid and a diamine, such as nylon 66, nylon 610, and nylon 612; copolymeric polyamides such as nylon 6/66, nylon 6/610, nylon 6/12, nylon 6/12, nylon 6/66/610, nylon 6/66/12, and nylon 6/6T (T stands for a terephthalic acid component); and mixtures thereof. The ratio of the terminal amino group concentration to the terminal carboxyl group concentration should be at least 1.5, and preferably at least 2.0, in these polyamides. If this concentration ratio is lower than 1.5, the adhesion of the polyamide to the coatings is poor. The upper limit of the concentration ratio is not particularly critical, and even a polyamide in which all the terminal groups are amino groups can be used. The molecular weight of the highly amino-terminated polyamide is not particularly critical, but ordinarily, a polyamide having a relative viscosity of 2.3 to 4.4, as measured according to the method of JIS K-6810, is used.

The highly amino-terminated polyamide may be prepared according to a method known to those skilled in the art, in which a chain transfer agent such as m-xylylenediamine, p-xylylenediamine, hexamethylenediamine or dodecamethylenediamine is used in the polymerization step.

Inorganic fillers that can be cited for use in the present invention include, for example, natural silicon compounds such as quartz, asbestos, diatomaceous earth, and mica; metal oxides such as titanium oxide, zinc oxide and alumina; metal salts such as barium sulfate, calcium sulfate, calcium carbonate, calcium silicate (wollastonite), magnesium carbonate, magnesium silicate (talc), and white lead; inorganic mixtures such as kaolin, clay, and glass; metal fiber such as of iron, aluminum, or brass, carbon fiber, and potassium titanate fiber. Among these inorganic fillers, talc, kaolin, and calcium silicate are most advantageous. These inorganic fillers may be used either alone or combined in mixtures of two or more. The average particle size of the inorganic filler is not particularly critical, but in order to increase the initial adhesion to the coating, it is preferable that the average particle size of the inorganic filler be not more than 20 $\mu$m.

The inorganic filler is incorporated in an amount of from 1 to 150 parts by weight, and preferably from 10 to 100 parts by weight, per 100 parts by weight of the highly amino-terminated polyamide. If the amount of the inorganic filler is less than the above range, the adhesion of the polyamide to the coating is poor. If the amount of the inorganic filler is larger than the above range, molding becomes difficult and the physical properties and surface smoothness of the molded article are degraded.

As the triazine to be used in the present invention, there can be mentioned triazine ring-containing compounds such as melamine, cyanuric acid, melamine cyanurate, methylene dimelamine, and ethylene dimelamine. It is preferable that the average particle size of the triazine be not more than 20 $\mu$m, and more preferably not more than 10 $\mu$m.

The amount of the triazine exceeds 1 part by weight per 100 parts by weight of the sum of the highly amino-terminated polyamide and the inorganic filler. If the amount of the triazine is not more than 1 part by weight per 100 parts by weight of the sum of the highly amino-terminated polyamide and the inorganic filler, the adhesion to a coating, especially a coating formed from an acrylic melamine type paint, is reduced. The upper limit of the amount of the triazine is not particularly critical.

However, if the triazine is incorporated in too large an amount, the moldability and physical properties are degraded. In addition, when the molded article obtained absorbs moisture, the triazine bleeds out on the surface of the molded article, causing the formation of blisters on the surface, which damages appearance and reduces adhesion to coatings. Accordingly, the triazine is ordinarily incorporated in an amount of up to 5 parts by weight, and preferably up to 2 parts by weight, per 100 parts by weight of the sum of the highly amino-terminated polyamide and the inorganic filler.

The method for incorporating the inorganic filler and triazine in the highly amino-terminated polyamide is not particularly critical, and any appropriate known method may be adopted. For example, according to one such method, the inorganic filler and triazine are kneaded together with a melt of the highly amino-terminated polyamide during or immediately after preparation of the polyamide. In another method, the inorganic filler and triazine are added to a powder or pellets of the highly amino-terminated polyamide, and the mixture is melt-kneaded.

Other additives such as heat-resisting agents, weathering agents including ultraviolet absorbers, flame retardants, antistatic agents, lubricants, plasticizers, nucleating agents, foaming agents, colorants, coupling agents and stabilizers may be added to the polyamide composition of the present invention, if desired, depending on the properties required for the polyamide composition.

The polyamide composition of the present invention can be formed into various molded articles by known molding methods such as injection molding, extrusion molding, or compression molding.

As pointed out above, the polyamide composition of the present invention is advantageously applied particularly to exterior trim parts on automobiles. The process of painting automobiles comprises the steps of (1) chemical preparation of the surface, (2) water washing and baking, (3) electrodeposition coating, (4) water washing and baking, (5) intercoating treatment, (6) baking, (7) topcoating, and (8) baking, which are conducted in the above order. An exterior trim part molded from the polyamide composition of the present invention can be attached to a car body between the baking (6) and the topcoating (7) steps, then subjected to top coating treatment together with the car body.

The present invention will now be described in detail with reference to the following examples and comparative examples. In the examples and comparative examples, the adhesion between the polyamide moldings and coatings was determined by the following procedure.

Cuts were formed on the coating at intervals of about 1.5 mm in both the longitudinal and transverse directions. Adhesive tape was then applied to the coating and the tape peeled off. The adhesion was evaluated according to the degree of peeling of the cross-cut coating.

Evaluation was carried out at room temperature and rated as follows:
A: no peeling of the coating occurred
B: the cut line portions of the coating were peeled off
C: part of the coating was peeled off
D: the entire coating was peeled off All references to "parts" in the examples and comparative examples are by weight.

EXAMPLE 1

One hundred parts of nylon 6 with a relative viscosity of 2.8 and a ratio of terminal amino group concentration to terminal carboxyl group concentration of 5.1 was dry-blended with 67 parts of calcium silicate having an average particle size of 14 μm and 1.5 parts, per 100 parts by weight of the sum of the nylon and calcium silicate, of melamine. The mixture was melt-kneaded and pelletized in a twin-screw extruder having a screw diameter of 30 mm at a cylinder temperature of 250° C., a screw rotation rate of 100 rpm, and an extrusion rate of 10 kg/hr, then dried at reduced pressure and 110° C. for 24 hours. The pellet thus obtained was injection-molded at a cylinder temperature of 270° C. into 75 mm×120 mm×3 mm test pieces using a screw type injection molding machine. A mold in which a gate was provided at the narrow side of cavity walls was used.

Acrylic melamine type paint ("Belcoat 5700" (trademark) supplied by Nippon Yushi K.K.) was coated on each test piece while absolutely dry to a thickness of 40 μm, and baking carried out at 140° C. for 30 minutes.

The adhesion of the coating both immediately after preparation and after 24 hours was measured to determine the change in adhesion over time. The adhesion of the coating after 72 hours of immersion in hot water maintained at 60° C. was measured to determine the water-resistant adhesion. Furthermore, the adhesion of the coating after 120 hours of standing in an atmosphere maintained at a temperature of 50° C. and a relative humidity of 95% was measured to determine the moisture-resistant adhesion. The results are shown in Table 1.

COMPARATIVE EXAMPLES 1 AND 2

The procedures in Example 1 were repeated in the same manner except that melamine was not incorporated (Comparative Example 1), or the amount of melamine was changed to 0.5 part (Comparative Example 2). The results are shown in Table 1.

COMPARATIVE EXAMPLE 3

The procedures in Example 1 were repeated in the same manner except that 100 parts of nylon 6 with a ratio of terminal amino groups to the terminal carboxyl groups of 1.0 and having a relative viscosity of 2.8 was used. The results are shown in Table 1.

TABLE 1

|  | Amount (parts) of Melamine | Change of Adhesion over Time | | | | Water-Resistant Adhesion | | Moisture-Resistant Adhesion | |
|---|---|---|---|---|---|---|---|---|---|
|  |  | Immediately after preparation | | After 72 hours | | | | | |
|  |  | On gate side | On side opposite to gate | On gate side | On side opposite to gate | On gate side | On side opposite to gate | On gate side | On side opposite to gate |
| Example 1 | 1.5 | A | A | A | A | A | A | A | A |
| Comparative Example 1 | 0 | D | D | D | D | — | — | — | — |
| Comparative Example 2 | 0.5 | C | B | C | B | — | — | — | — |

TABLE 1-continued

|  | Amount (parts) of Melamine | Change of Adhesion over Time | | | | Water-Resistant Adhesion | | Moisture-Resistant Adhesion | |
|---|---|---|---|---|---|---|---|---|---|
|  |  | Immediately after preparation | | After 72 hours | | | | | |
|  |  | On gate side | On side opposite to gate | On gate side | On side opposite to gate | On gate side | On side opposite to gate | On gate side | On side opposite to gate |
| Comparative Example 3 | 1.5 | C | B | C | B | — | — | — | — |

EXAMPLE 2

The procedures in Example 1 were repeated in the same manner except that 11 parts of a colorant (Gray 10-Times Master Color Nylon Chip supplied by Shinko Kasei K.K.; the colorant content was 3.4% by weight) having the same color as that of a gray sealer for an exterior trim parts on automobile was incorporated together with calcium silicate and melamine. The results are shown in Table 2.

COMPARATIVE EXAMPLE 4

The procedures in Example 2 were repeated in the same manner except that the amount of melamine was changed to 0.5 part. The results are shown in Table 2.

EXAMPLE 3

The procedures in Example 2 were repeated in the same manner except that a melamine alkyd type paint (Melamine No. 1 supplied by Nippon Yushi K.K.) was used instead of the acrylic melamine type paint. The results are shown in Table 2.

TABLE 2

|  | Amount (parts) of Melamine | Change of Adhesion over Time | | | | Water-Resistant Adhesion | | Moisture-Resistant Adhesion | |
|---|---|---|---|---|---|---|---|---|---|
|  |  | Immediately after preparation | | After 72 hours | | | | | |
|  |  | On gate side | On side opposite to gate | On gate side | On Side opposite to gate | On gate side | On side opposite to gate | On gate side | On side opposite to gate |
| Example 2 | 1.5 | B | A | B | A | B | B | B | B |
| Comparative Example 4 | 0.5 | D | C | D | C | — | — | — | — |
| Example 3 | 1.5 | A | A | A | A | A | A | A | A |

EXAMPLE 4

The procedures in Example 1 were repeated in the same manner except that 1.5 parts of ethylenedimelamine was used instead of melamine. The results are shown in Table 3.

COMPARATIVE EXAMPLE 5

The procedures in Example 4 were repeated in the same manner except that the amount of ethylenedimelamine was changed to 0.5 part. The results are shown in Table 3.

TABLE 3

|  | Amount (parts) of Melamine | Change of Adhesion over Time | | | | Water-Resistant Adhesion | | Moisture-Resistant Adhesion | |
|---|---|---|---|---|---|---|---|---|---|
|  |  | Immediately after preparation | | After 72 hours | | | | | |
|  |  | On gate side | On side opposite to gate | On gate side | On side opposite to gate | On gate side | On side opposite to gate | On gate side | On side opposite to gate |
| Example 4 | 1.5 | B | A | B | A | A | A | A | A |
| Comparative Example 5 | 0.5 | C | C | C | C | — | — | — | — |

We claim:

1. A polyamide composition comprising a polyamide with a ratio of the terminal amino group concentration to the terminal carboxyl group concentration of at least 1.5, an inorganic filler, and a triazine, wherein the amount of the inorganic filler is in the range of from 1 to 150 parts by weight per 100 parts by weight of the polyamide and the amount of the triazine is more than 1 part by weight but not more than 5 parts by weight per 100 parts by weight of the sum of the polyamide, and the inorganic filler.

2. A polyamide composition according to claim 1 wherein said polyamide has a ratio of the terminal amino group concentration to the terminal carboxyl group concentration of at least 2.0.

3. A polyamide composition according to claim 1 wherein said polyamide has a relative viscosity of from 2.3 to 4.4.

4. A polyamide composition according to claim 1 wherein said inorganic filler is selected from the group consisting of metal oxides, metal salts of an inorganic acid, metal fibers, a carbon fiber, a metal titanate fiber, and mixtures thereof.

5. A polyamide composition according to claim 1 wherein said inorganic filler is selected from the group consisting of talc, kaolin, and calcium silicate.

6. A polyamide composition according to claim 1 wherein said inorganic filler is in the form of particles having an average particle size of not more than 20 μm.

7. A polyamide composition according to claim 1 wherein the amount of said inorganic filler is in the range of from 10 to 100 parts by weight per 100 parts by weight of the polyamide.

8. A polyamide composition according to claim 1 wherein said triazine is selected from the group consisting of melamine, cyanuric acid, melamine cyanurate, methylene dimelamine, and ethylene dimelamine.

9. A polyamide composition according to claim 1 wherein said triazine is in the form of particles having an average particle size of not more than 20 μm.

* * * * *